United States Patent
Rodriguez

(10) Patent No.: US 10,268,217 B2
(45) Date of Patent: Apr. 23, 2019

(54) MIXING VALVE ASSEMBLY, TAP AND PLANT PROVIDED WITH SAID VALVE ASSEMBLY

(71) Applicant: Huber Cisal Industrie S.p.A., San Maurizio d'Opaglio, Novara (IT)

(72) Inventor: Jean Jacques Rodriguez, San Maurizio d'Opaglio (IT)

(73) Assignee: Huber Cisal Industrie S.p.A., San Maurizio d'Opaglio (IT)

( * ) Notice: Subject to any disclaimer, the term of this patent is extended or adjusted under 35 U.S.C. 154(b) by 99 days.

(21) Appl. No.: 15/555,747

(22) PCT Filed: Mar. 4, 2016

(86) PCT No.: PCT/IB2016/051232
§ 371 (c)(1),
(2) Date: Sep. 5, 2017

(87) PCT Pub. No.: WO2016/142820
PCT Pub. Date: Sep. 15, 2016

(65) Prior Publication Data
US 2018/0059693 A1    Mar. 1, 2018

(30) Foreign Application Priority Data

Mar. 6, 2015 (IT) .............................. MI2015A0339

(51) Int. Cl.
*G05D 23/13* (2006.01)
*F16K 11/074* (2006.01)
(Continued)

(52) U.S. Cl.
CPC ....... *G05D 23/1353* (2013.01); *E03C 1/0404* (2013.01); *F16K 11/0743* (2013.01);
(Continued)

(58) Field of Classification Search
USPC .................................................... 137/625.41
See application file for complete search history.

(56) References Cited

U.S. PATENT DOCUMENTS 5,433,378 A * 7/1995 Orlandi ............... F16K 11/0746
236/12.2
6,279,831 B1 * 8/2001 Lorch ................ G05D 23/1353
236/12.13
(Continued)

FOREIGN PATENT DOCUMENTS

EP    1 022 636 A1    7/2000
EP    2 557 340 A1    2/2013

*Primary Examiner* — John Fox
(74) *Attorney, Agent, or Firm* — Blank Rome LLP

(57) ABSTRACT

Thermostatic mixing cartridge (3) for sanitary taps (1) comprising A) a manual control member (9) arranged to perform a control stroke with a single degree of freedom; B) a thermostatic element assembly (15) arranged to actuate the thermostatic valve (19) expanding or contracting according to the temperature of the liquid that laps around a thermostatic bulb (17) into the mixing chamber (25); C) an adjustment shaft (37) actuated by the manual control member (9) and arranged to C.1) to rotate the inlet shutter (11) so as to open the first (27) and the second inlet mouth (29); and C.2) to move the thermostatic element assembly (15) at least according to the predetermined adjustment direction (AR) so as to adjust the predetermined reference temperature. The cartridge lends itself to be realized with very small dimensions, forcing a user to open the tap supplied with cold water only, with energy savings.

19 Claims, 9 Drawing Sheets

(51) Int. Cl.
*F16K 11/00* (2006.01)
*F16K 31/00* (2006.01)
*E03C 1/04* (2006.01)
*F16K 11/085* (2006.01)
*F16K 31/60* (2006.01)

(52) U.S. Cl.
CPC .......... *F16K 11/085* (2013.01); *F16K 19/006* (2013.01); *F16K 31/002* (2013.01); *F16K 31/602* (2013.01)

(56) References Cited

U.S. PATENT DOCUMENTS

| | | | | |
|---|---|---|---|---|
| 6,325,295 | B1* | 12/2001 | Lorch | G05D 23/1353 137/269 |
| 6,517,006 | B1* | 2/2003 | Knapp | F16K 3/34 137/625.41 |
| 7,905,424 | B2* | 3/2011 | Li | F16K 11/0743 137/625.4 |
| 8,074,893 | B2* | 12/2011 | Mace | G05D 23/1353 236/12.11 |
| 9,958,881 | B2* | 5/2018 | Draber | G05D 23/132 |
| 2003/0234295 | A1* | 12/2003 | Mace | G05D 23/1353 236/12.2 |
| 2004/0016815 | A1 | 1/2004 | Bergmann et al. | |
| 2011/0240155 | A1* | 10/2011 | Platet | G05D 23/1353 137/605 |

* cited by examiner

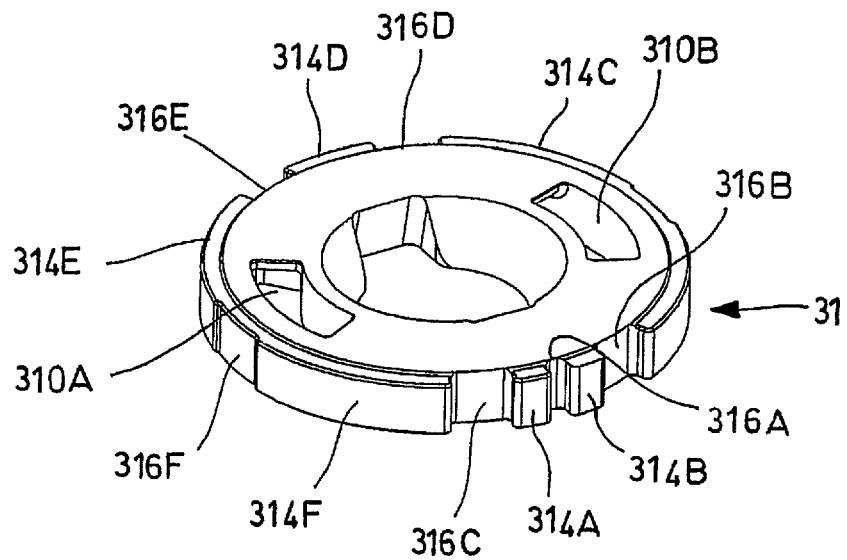
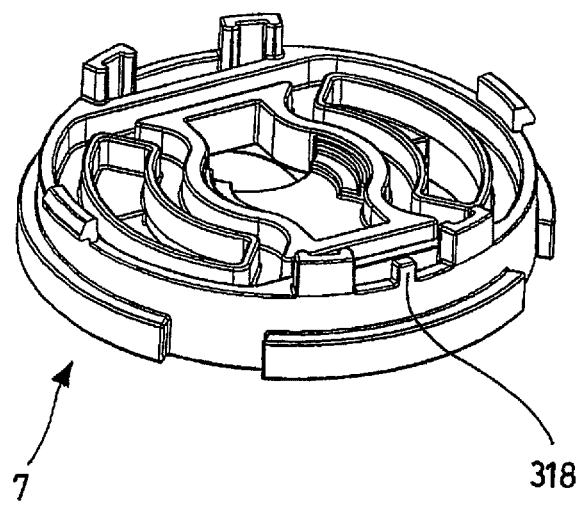
Fig.7

MIXING VALVE ASSEMBLY, TAP AND PLANT PROVIDED WITH SAID VALVE ASSEMBLY

FIELD OF THE INVENTION

[1] This invention relates to a thermostatic mixing valve assembly and a tap usable for example in systems for dispensing water in bathrooms, kitchens, offices or other working environments, hospitals or even in industrial plants.

STATE OF THE ART

[2] The most recent regulatory, commercial and even cultural trends favoring greater energy savings in the field of sanitary facilities have resulted in a further boost to reduce water consumption in general and especially that of domestic hot water. For this purpose, it has been noted that, at the end of use, people tend to leave the levers of single-lever mixing valves levers in the central position and, consequently, to start the next use from the same position. By making the lever in the central position open only the cold water, one avoids opening the hot water at each new use of the mixing valve, i.e., even when there is no need, saving hot water in general and avoiding turning on the boiler unnecessarily in autonomous heating systems. This technique, which has been used for several years with single-lever mixing valves, does not work with current thermostatic mixing taps. This latter type of mixing valve is used for example for showers: since they are provided with an internal thermostatic valve, they are able to automatically regulate the incoming flows of hot and cold water so as to make the temperature of the exiting mixed water more constant, automatically compensating unwanted and unpleasant variations of the pressure and temperature of the incoming flows of hot and cold water. Thermostatic mixing valves are currently known with dual or single control.

[3] Dual-control thermostatic mixing valves have two knobs or levers, one for adjusting the temperature and the other for adjusting the flow rate of the exiting water.

Current single-lever thermostatic mixing valves are, instead, provided with a single control level with two different movements:
 a lifting and lowering movement rotating for example around a first rotation axis, for example horizontal; and
 a rotation movement around a second rotation axis perpendicular to the first axis, and thus for example vertical.

In known thermostatic mixing taps, in both those with dual and single control, the user can act at his discretion on two degrees of freedom independent of each other to adjust the flow rate and temperature of the water dispensed and the fact that he opens the tap by only opening the cold water outlet depends exclusively on his good will.

One purpose of this invention is therefore to provide a thermostatic mixing valve assembly, usable for example for showers or other sanitary systems, that pushes the user in a more binding manner, with respect to the known mixing taps, to begin using the tap itself by opening only the cold water outlet, at least initially, and that has a relatively small size.

SUMMARY OF THE INVENTION

This purpose is achieved, in a first aspect of this invention, with a mixing valve assembly having characteristics according to claim 1.

In other words, the technical problem is solved by a thermostatic mixing valve assembly, comprising:
 a first and a second inlet mouth for the introduction of liquids at different temperatures;
 a mixing assembly arranged to mix and homogenize, said liquids at different temperatures;
 an inlet shutter arranged to prevent or allow the inflow of said liquids at different temperatures, towards the mixing assembly;
 wherein the mixing assembly comprises a thermostatic adjusting system having a mixing chamber arranged to accommodate and mix the liquids at different temperatures and obtain a mixed liquid at a predetermined reference temperature, a thermostatic shutter arranged to adjust the inflows said liquids in the mixing chamber, and a thermostatic element assembly arranged to actuate the thermostatic shutter by expanding or contracting at least along a predetermined adjustment direction (AR) based on the temperature of the liquid that flow's around a thermostatic bulb in the mixing chamber;
 a manual control member arranged to perform a control stroke with a single degree of freedom, controlling the inlet shutter and the thermostatic adjusting system to vary the flow rate and the reference temperature of the mixed liquid dispensed by the mixing valve assembly;
characterised in that
 the inlet shutter comprises a first plate of ceramic or other material,
 the valve assembly comprises an adjustment shaft actuated by the manual control member and arranged to:
 the inlet shutter rotates around a rotation axis parallel to said Rotate the shutter entrance around an axis of rotation parallel to said predetermined adjustment direction (AR), so as to open the first and the second inlet mouth, wherein the inlet shutter is fixed axially with respect to the predetermined adjustment direction (AR),
 the thermostatic element assembly is moved according to the predetermined adjustment direction (AR) so as to adjust the predetermined reference temperature.

Further characteristics of the device and the method according to the invention are covered in the dependent claims.

The advantages attainable with this invention will become more apparent to one skilled in the art from the following detailed description of some particular embodiments of a non-limiting character, illustrated with reference to the following schematic figures.

LIST OF FIGURES

FIG. 7 shows an exploded view of the error-proof system of the valve assemblies of FIGS. 1-6;

DETAILED DESCRIPTION

Figure 1:
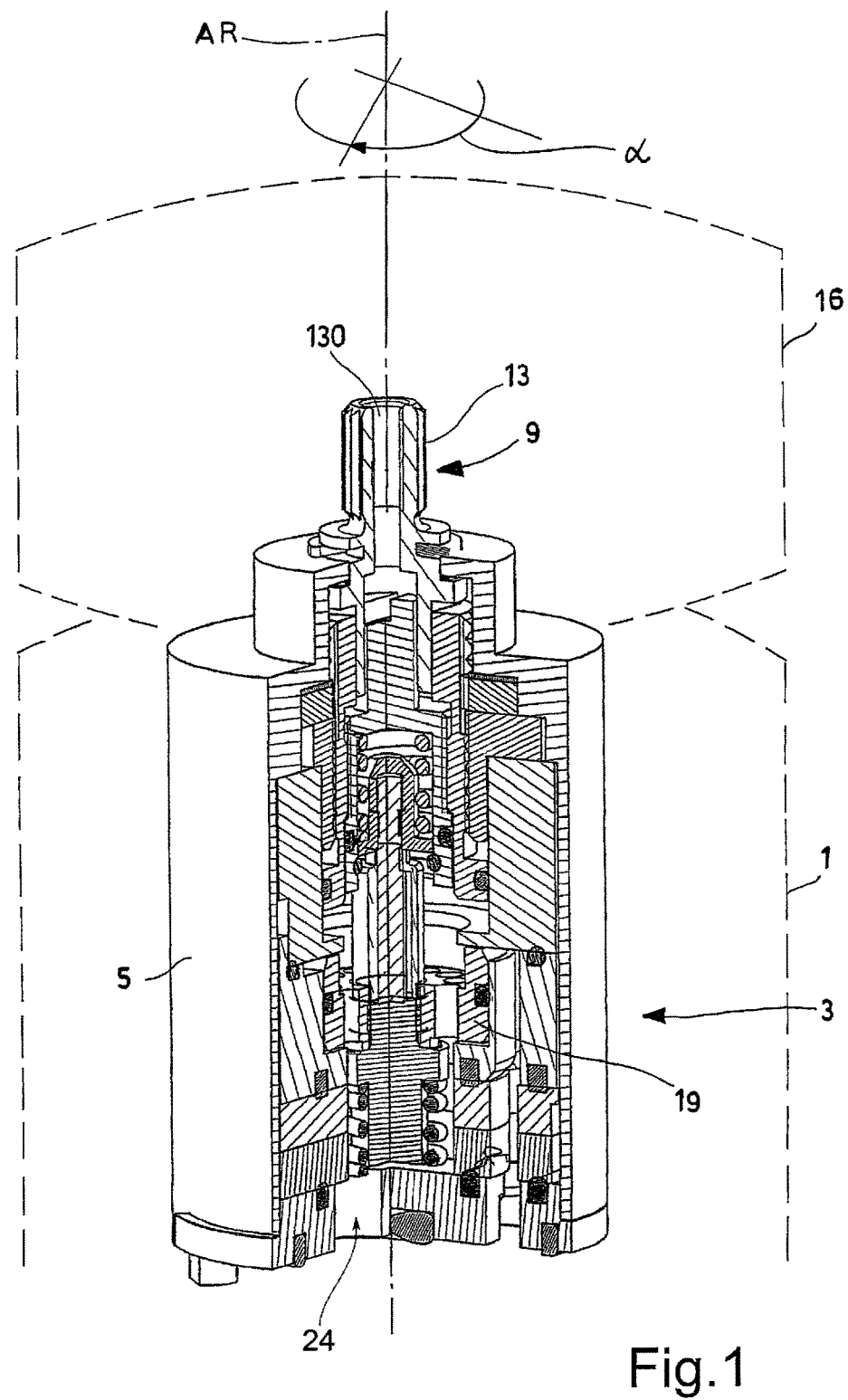
FIG. 1 shows a perspective view, partially in section, of a thermostatic mixing valve assembly according to a first particular embodiment of the invention.
Figure 2:
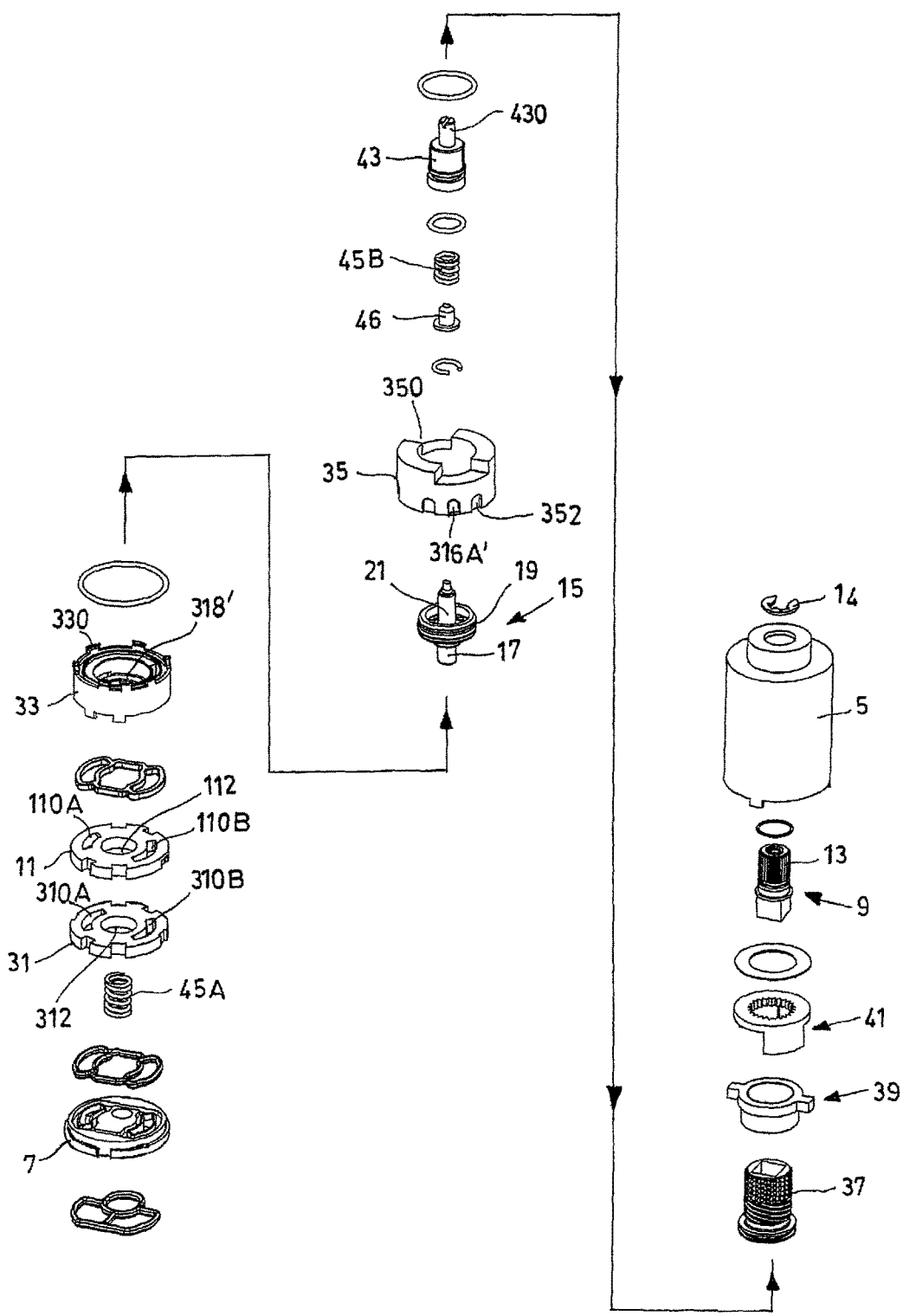
FIG. 2 shows an exploded perspective view of the valve assembly of FIG. 1.

FIGS. 1-5 relate to a thermostatic mixing valve assembly and a tap provided with such a valve assembly according to a first particular embodiment of the invention. The tap is indicated with the overall reference 1, While the thermostatic mixing valve assembly, also more colloquially called "cartridge assembly", with the overall reference 3; both are particularly suitable to be used for example in domestic sanitary systems, for example of showers, bathtubs, washbasins and bidets. The cartridge assembly 3 preferably comprises an outer casing 5 closed below by a bottom 7. The outer casing 5 can have a substantially tubular, cylindrical or prismatic tubular shape. According to an aspect of the invention, the cartridge assembly 3 is provided with:

a manual control member 9 arranged to carry out a control stroke with a single degree of freedom;

a mixing assembly arranged to mix and homogenise a flow of cold water or other cold liquid and a flow of hot water or other hot liquid entering the valve assembly;

an inlet shutter 11 arranged to prevent or allow the inflow of said cold and hot water or other cold and hot liquids towards the mixing assembly.

The manual control member 9 preferably comprises a rotary head 13, on which can be inserted a second knob 16, larger and more comfortable to grip, for example of the type used to actuate the usual sanitary taps; preferably the rotation of the head 13 by a suitable angle constitutes its rotation stroke with a single degree of freedom. Alternatively, the manual control member 9 with a single degree of freedom can be a simple translating or rotary-translating member. Preferably, the rotary head 13 is axially fixed to the casing 5 for example by means of the Seeger ring 14.

The mixing assembly comprises a thermostatic adjusting system arranged to automatically adjust the mixing and homogenisation of the flow of cold and hot water entering the cartridge 5 so as to bring the temperature of the mixed water exiting from the valve close to a predetermined reference temperature.

The thermostatic adjusting system comprises:

a mixing chamber 25 arranged to receive and mix together with the flow of cold water and the flow of hot water entering for example through the inlet ducts 27,29;

a thermostatic shutter 19 arranged to adjust, for example by more or less throttling the inflows of hot and cold water in the mixing chamber 25; and a thermostatic element assembly 15 arranged to actuate the thermostatic shutter 19 by expanding or contracting according to the temperature of the water that laps a thermostatic bulb 17 located in the mixing chamber 25 and forming part of the assembly 15.

The thermostatic element assembly 15 can in turn comprise the thermostatic bulb 17, the thermostatic shutter 19 and a stem 21. Preferably the thermostatic bulb 17, and the thermostatic shutter 19 are fixed integrally to the stem 21 and coaxially to it. The thermostatic bulb 17, in itself known, may comprise a metal or plastic casing containing a wax or other substance with a sufficiently high thermal expansion coefficient.

Figure 3:
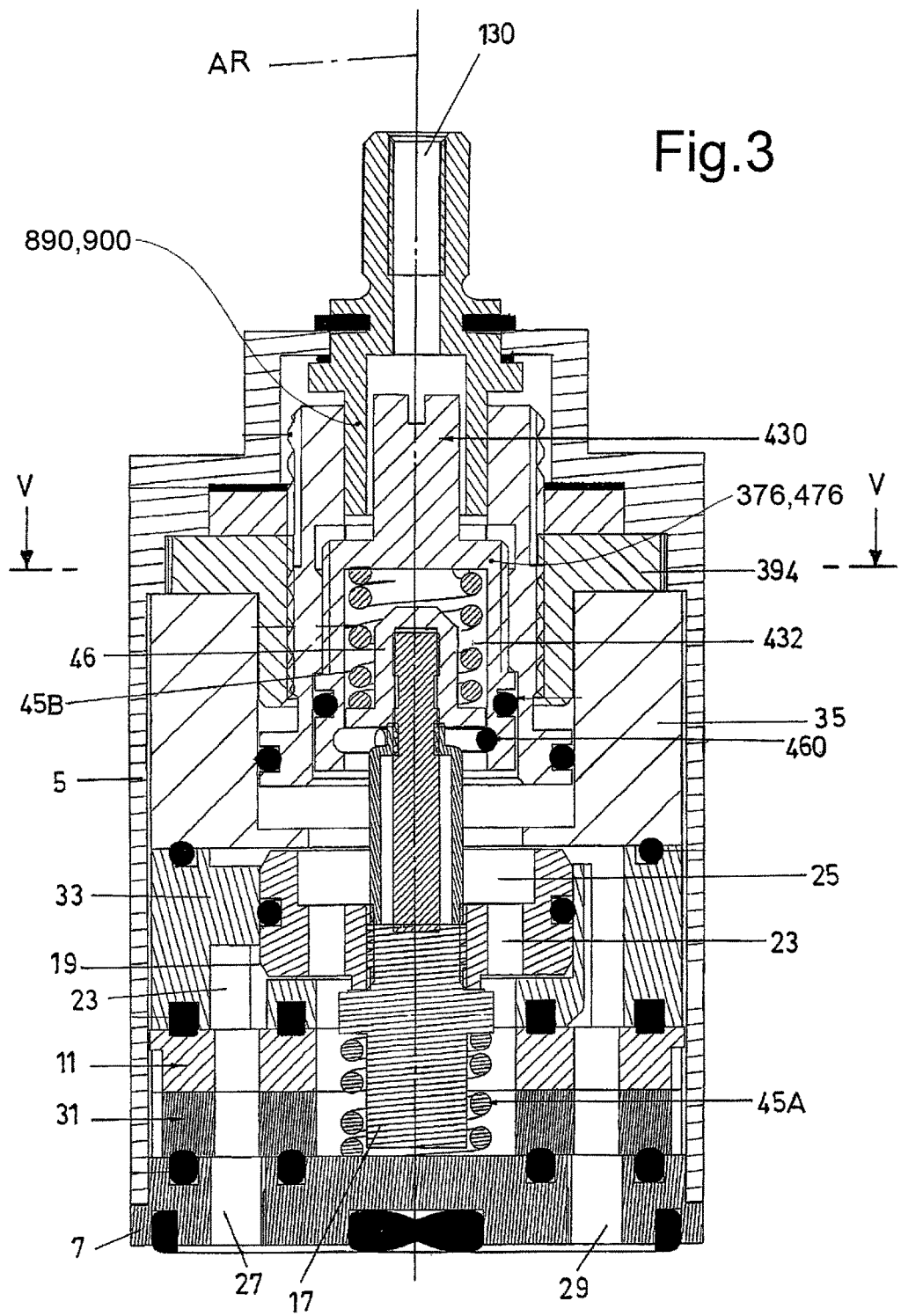
FIG. 3 shows a sectional view according to a section plane passing along the axis AR of the valve assembly of FIG. 1.

The thermostatic shutter 19 preferably has a cylindrical, annular or otherwise axially symmetrical shape, and is connected to the stem 21 by means of perforated plate—the references 23 of FIG. 3 indicate the holes of such plate—or a plurality of rays that allow the hot water and cold present in the chamber 25 to mix better passing through the shutter 19. The thermostatic element assembly 15 is inserted in the mixing chamber 25.

The inlet shutter 11 is preferably realised as a disc or plate of ceramic material, of the type in itself known. Preferably the ceramic shutter 11 opens and closes the hot water 27 and cold water 29 inlets by rotating and sliding over an inlet shutter seat 31, preferably made as a second disc or plate of ceramic material, inserted in the bottom 7 and integral pad with it and with the outer casing 5. The shutter 11 and its seat 31 therefore realise a kind of ceramic seal which presents several advantages with respect to the polymeric material seals that mainly obstruct due to radial pressure compression: for example, they are not subject to permanent deformations and extrusions after long use.

Always according to an aspect of the invention, the manual control member 9 is arranged to control the inlet shutter 11 and the thermostatic adjusting system so that the flow rate and the reference temperature of the mixed water dispensed by the mixing valve assembly 3 vary according to the position of the manual control member 9 along the control stroke.

Preferably, the rotation of the rotary head 13—or more in general of the manual control 9—allows continuously varying the reference temperature to which the thermostatic adjusting system tends to bring the temperature of the mixed water exiting from the cartridge itself, by associating a reference temperature to an angular position of the rotary head 13—or to a position of the manual control 9 along its adjustment stroke.

According to an embodiment, the mixing assembly 3 is provided with an outlet mouth 24 of the mixed liquid, and the outlet mouth 24 is arranged on the same side of the inlet mouths 27,29, axially opposite to the manual control member 9 with respect to the predetermined adjustment direction AR.

The adjustment shaft 37 is arranged so that the thermostatic element assembly 15 is exclusively provided with an axial movement along the predetermined adjustment direction AR, and the inlet shutter 11 is exclusively provided with a rotary movement around a rotation axis parallel to the predetermined adjustment direction AR.

Thanks to the fact that the shutter is exclusively provided with a rotary movement and therefore not translatory movement, it is possible to significantly reduce the overall axial dimensions of the thermostatic mixing valve assembly 3.

Even the positioning of the inlet mouths 27,29 and outlet mouths 24 on the same side and in a manner axially opposite to the manual control member 9 allows a reduction of the overall axial dimensions of the thermostatic mixing valve 3.

Preferably, instead, the rotation of the rotary head 13—or more generally of the manual control member 9—only allows opening and closing the outflow of water from the cartridge 5 without being able, however, to continuously vary the flow rate; essentially, in an embodiment of the invention, by rotating the head 13 it is only possible to realise a control substantially of the all/nothing type, i.e., fully open/fully closed, of the flow of water entering the cartridge 5 or exiting from it.

This all/nothing adjustment of the exiting flow rate can be obtained for example by suitably selecting the shape of the openings 110A,110B,310A,310B formed on the ceramic plates 11,31.

Doing so avoids constraining particular temperatures to too low (tap almost closed) or very high (tap fully or almost open) values of the flow rate of the water exiting from the cartridge 3, thus avoiding excessively limiting the freedom and comfort of use of the thermostatic tap.

Figure 4:
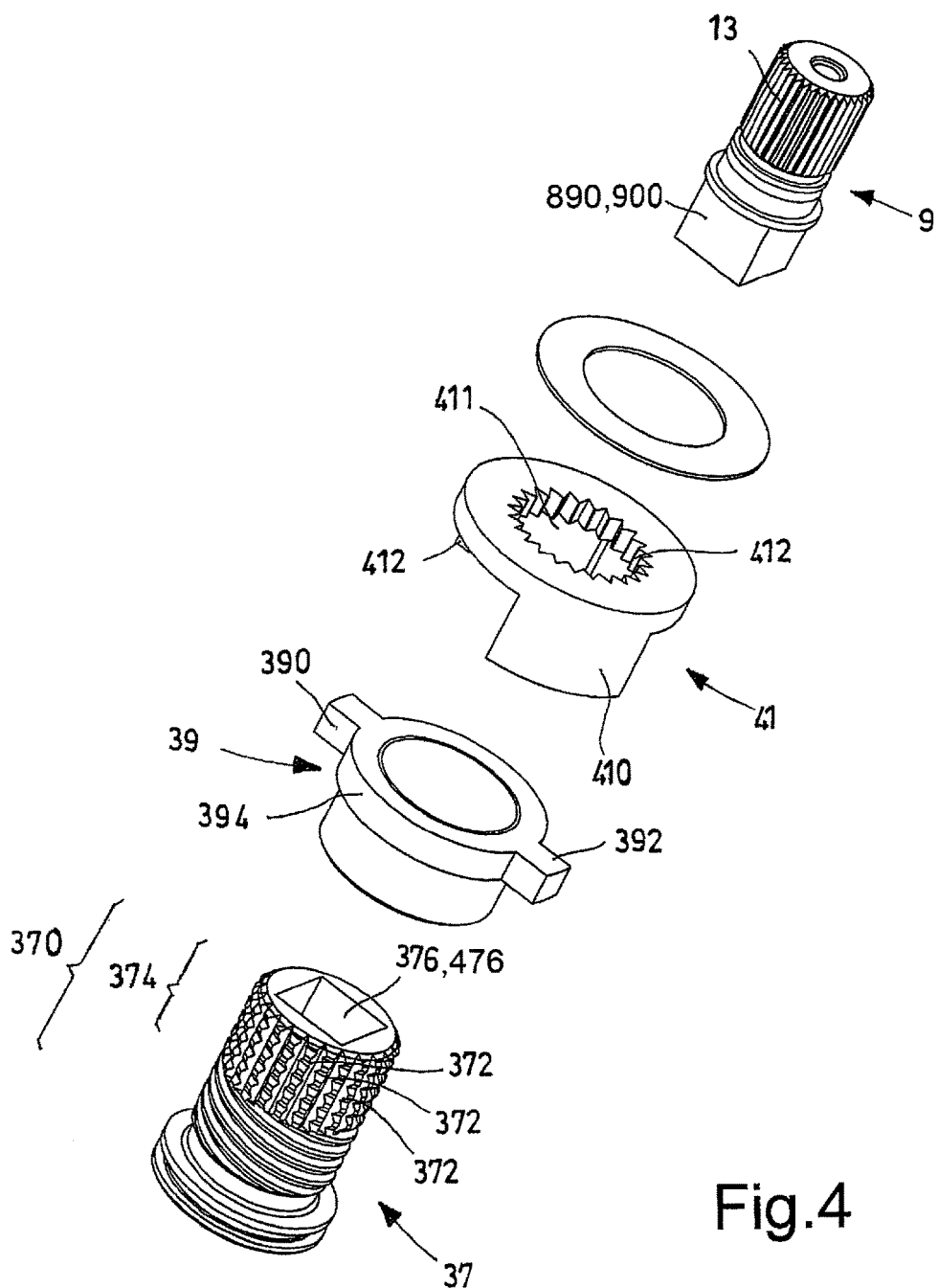
FIG. 4 shows an exploded perspective view of several components of the valve assembly of FIG. 1.
Figure 5:
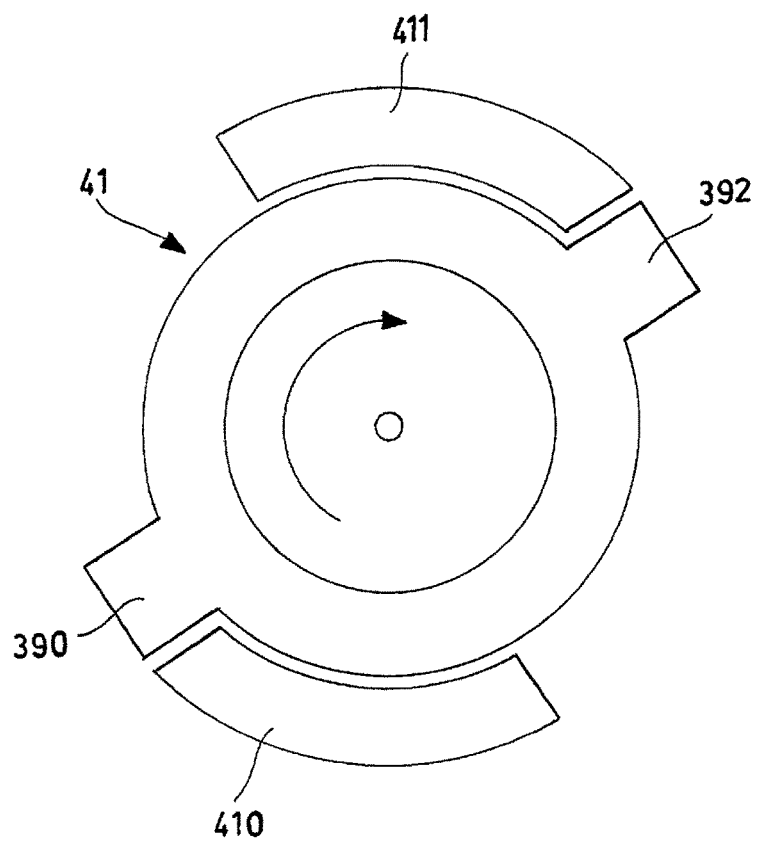
FIG. 5 shows a partial sectional view according to a section plane V-V perpendicular to the axis AR, of the nut screw and internally channeled matrix of the valve assembly of FIG. 1.

The cartridge 5 preferably comprises the following elements:
- a first casing 33 and a second inner tubular casing 35, each of which having both ends opened and prepared to be axially coupled to one another so as not to be able to rotate with respect to one another;
- an adjustment shaft 37 provided with:
  a) a threaded portion 370 arranged to convert the rotations of the rotary head into translations or rototransations of the adjustment shaft 37; and
  b) one or more radial projections 372 arranged to transmit to the inlet shutter, so as to actuate it, the driving torque of the rotary head 13 (FIG. 4).

[16] Preferably, the radial projections 372 form a plurality of grooves parallel to each other and the axis of the threaded portion 370. Preferably, the plurality of grooves 372 extends on at least part of the threaded portion 370, for example on a second portion 374 the shaft 37. The portion 370 can have a thread with one or more beginnings, for example even with four or six beginnings.

Advantageously, the thread of the portion 370 also extends over the entire second grooved portion 374, allowing the screwing of the nut screw 39 on the adjustment shaft 37; in other words, in the portion 374, the radial projections 372 form both a plurality of axial grooves and a thread, allowing greatly reducing the axial dimensions of the cartridge assembly 1.

Preferably, the cartridge 5 comprises an element with nut screw 39, preferably having the form of an internally threaded bushing, and a driver element 41 on which is formed an opening or an internally splined hole 411.

The nut screw 39 is designed to mate with the male thread of the adjustment shaft 37. The driver element 41 can have substantially the shape a washer or a bushing; the edges of its central opening 411 form a plurality of axial grooves 412 arranged to mate with the knurling of the grooved portion 374 of the adjustment shaft 37. Preferably, the driver element 41 engages with the second inner tubular casing 35 so that it cannot rotate with respect to it, for example thanks to the axial tabs 410,411 that are inserted in the seats 350 of the tubular casing 35.

The nut screw 39 is locked so that it cannot slide axially with respect to the second inner tubular casing 35 and the driver element 41; for this purpose, the nut screw 39 may be packed between the second inner tubular casing 35 and the driver element 41, being partially inserted in the second inner tubular casing 35 remaining locked axially thanks for example to a shoulder 394, and leaning on one of its ends against the annular bottom of the driver element 41. The nut screw 39 cannot rotate with respect to the second casing 35 and with respect to the longitudinal axis of the chamber 25; for this purpose, the nut screw 39 may for example be provided with radial projections 390,392 formed on the nut screw 39 and are arranged to be inserted in corresponding recesses formed in the internal cavity of the outer casing 5 of the cartridge, so as to prevent mutual rotations between cartridge and nut screw 39. Preferably the radial projections 390,392 are also arranged to abut against the sides of the axial tabs 410,411 so as to limit the maximum possible rotation of the first shutter plate 11.

The head 13 actuates the adjustment shaft 37 so that it can drive it in rotation about the longitudinal axis AR of the cartridge but remain free to slide axially with respect to shaft 37; this can be realised for example by forming a square or prismatic head 900 at the lower end of the head 13, and engaging said head with a corresponding square or prismatic seat 376 formed at one end of the adjustment shaft 37, without axially locking the head 900 in the seat 376.

Advantageously, the cartridge 3 is provided with a calibration system 43 that allows adjusting the longitudinal position of the thermostatic element assembly 15 to a predetermined reference temperature, for example in order to adapt the cartridge 3 in different operating conditions—for example, different pressures or temperatures of the incoming hot and cold water—from those of the test bench which it was tested and adjusted in the factory.

The calibration device 43 may comprise an adjustment screw 430 and is preferably interposed between the head 13 and the thermostatic element assembly 15. Preferably, at least the adjustment screw 430 is housed in the control 9, for example inside the square or prismatic head 900, and is accessible from the outside through an axial hole 130 formed in the head 13 (FIGS. 1 and 3).

The mixing chamber 25 can be delimited by the walls of the internal cavity of the first 33 and the second inner tubular casing 35, by the walls of the central holes 112,312 formed in the first 11 and the second disc or plate of ceramic material 31 as well as by the bottom 7 and by a cavity 432 inside the calibration system 43. The mixing chamber 25 and the thermostatic element assembly 15 preferably have an elongated shape, and the stem 21 is preferably oriented in the longitudinal direction of the chamber 15. The axial position of the thermostatic element assembly 15 in the mixing chamber 25 is preferably determined by the deformation of the spring 45A and, in the event of sudden variations of the temperature of the water that laps the bulb 17, by the equilibrium of the two springs 45A,45B that push bulb assembly 15 towards two directions opposite and longitudinal to the chamber 25. The second spring 45B is part of a safety system, in itself known, that allows the stem to expand axially also in case of sudden variations in the temperature of the water that laps the bulb 17, avoiding the risk of breakage. In the absence of such abrupt changes, the support interfaces 46,46' driven by the spring 45B lean against the Seeger ring 460.

The thermostatic shutter 19 is disposed between the outlet of the hot water supply duct 27 and the outlet of the cold water supply duct 29. The thermal expansion of the thermostatic bulb 17 moves the thermostatic shutter 19 axially so as to throttle one of the hot or cold water feeds more and the other less, bring the temperature of the water in the mixing chamber 25 close to a predetermined set reference temperature for example by axially moving the thermostatic element assembly 15.

Advantageously, the head 13, the adjustment screw 430, the adjustment shaft 37, the casings 33,35, the shutter 11 and the driver element 41 rotate around the same rotation axis AR and are arranged substantially coaxial to it (FIG. 1). Preferably, the mixing chamber 25 and the thermostatic bulb assembly 15, or at least its rod 21 are substantially coaxial to the axis AR.

The operation of the tap 1 and its cartridge 3 will now be described.

The cartridge 3 can be for example inserted in a tap 1 that supplies for example a shower of a bathroom of a dwelling.

In correspondence of the complete closure position of the water, the thermostatic adjustment system fixes the reference temperature to the minimum of the values assumed over the entire stroke of the rotary head 13, preferably in such a way that the thermostatic shutter 19 fully closes the hot water supply duct 27 and fully opens that of the cold water 29.

By rotating, the head 13 drives in rotation of the adjustment shaft 37 which in turn, through the splined coupling 374-412 causes the driver element 41, the first 33 and the second inner tubular casing 35 and the inlet shutter 11 to rotate around the axis AR. The latter, thanks for example to the particular shape of its holes and those formed on the inlet shutter seat 31, as soon as the head 13 begins to rotate, quickly and completely opens the cold water supply 29, keeping completely closed that of the hot water 27.

By rotating with respect to the nut screw 39, which is integral with the outer casing 5 of the cartridge, the adjustment shaft 37 moves axially closer to the thermostatic bulb 17 or away from it.

Advantageously, the cartridge assembly 1 is arranged so that, in an initial phase of the opening rotation of the head 13 the adjustment shaft 37 does not engage with the stem 21 and thus does not vary the reference temperature thermostatic element assembly; preferably, at this initial stage the reference temperature is pre-set to a sufficiently low value so that the thermostatic shutter does not throttle, or throttles relatively little, the cold water supply 29. Therefore, in this initial stage of the rotation of the head 13, which can be for example approximately equal to 25-35 degrees, the cartridge assembly dispenses only cold water. Advantageously, after this initial rotation stage, the adjustment shaft 37 is arranged to engage with the stem 21 thus beginning to axially move the thermostatic element assembly 15 varying—in particular starting to increase—the reference temperature; preferably in this second stage of the rotation of the head 13, an increased angle of rotation of the head 13 leads to an increase of the reference temperature, and preferably also an increase of the total flow rate of the water dispensed from the cartridge; this operation functioning can also be achieved by suitably shaping the openings made in the shutter 11 and 31 at its seat. The maximum angle of rotation of the head 13 can be for example approximately equal to 90° or clearly even greater.

The mechanism just described allows beginning to supply with only cold water the tap 1 when it is opened and until it dispenses the maximum flow rate of the water permitted in the case of all/nothing adjustment, or at least a flow rate value of a certain consistency in the case of a single-lever tap in which a single manual control member with only one degree of freedom allows continuously varying both the flow rate and the reference temperature of the water dispensed.

One can also think of reducing the range of operation by supplying only cold water in taps 1 destined for countries with colder climates, and vice versa to extend the range of operation with supplying only cold water in taps 1 destined for countries with warmer climates. Since the length of the stem 21 or the position of the abutments against which it rests and formed on the adjustment shaft 37 or in any case actuated by it, can be varied with very modest investments in moulds or other production equipment, or with simple reworking operations by chip removal of moulded parts, the mechanical construction previously described of the cartridge 3 is particularly advantageous for adapting even small production batches to the climate of the destination countries and generally to the users' preferences.

By inserting a screwdriver or other appropriate tool in the axial hole 130 formed in the head 13, it is possible to rotate the screw 430 and axially move the thermostatic element assembly 15 further adjusting the reference temperature of the thermostatic bulb, typically to adjust the cartridge 3 when it is installed, adapting it to the conditions of the destination system, which are often different from those used to test and calibrate itself in the factory.

Since the end user, with the sole rotation of the head 13 adjusts both the flow rate and temperature of the water dispenses, the cartridge 3 obliges the user to supply the tap 1 by initially supplying it, when it is opened, with only cold water, and is therefore obliged by the mechanical construction of the cartridge 3 to consume less hot water. Unlike the known taps, this invention saves hot water independently of the habits and psychological mechanisms of the users, particularly if applied to taps arranged to deliver water with a maximum flow rate not exceeding 5 liters/minute.

The cartridge assembly previously described lends itself to be realised with very small bulk and very small external dimensions such as to be able to replace non-thermostatic cartridges of 40 mm and 35 mm in diameter mounted on existing single-lever taps; to this reduction of overall dimensions, a significant contribution is made by the fact that, in the portion 374, the radial projections 372 form both a plurality of axial grooves and a thread.

Figure 6:
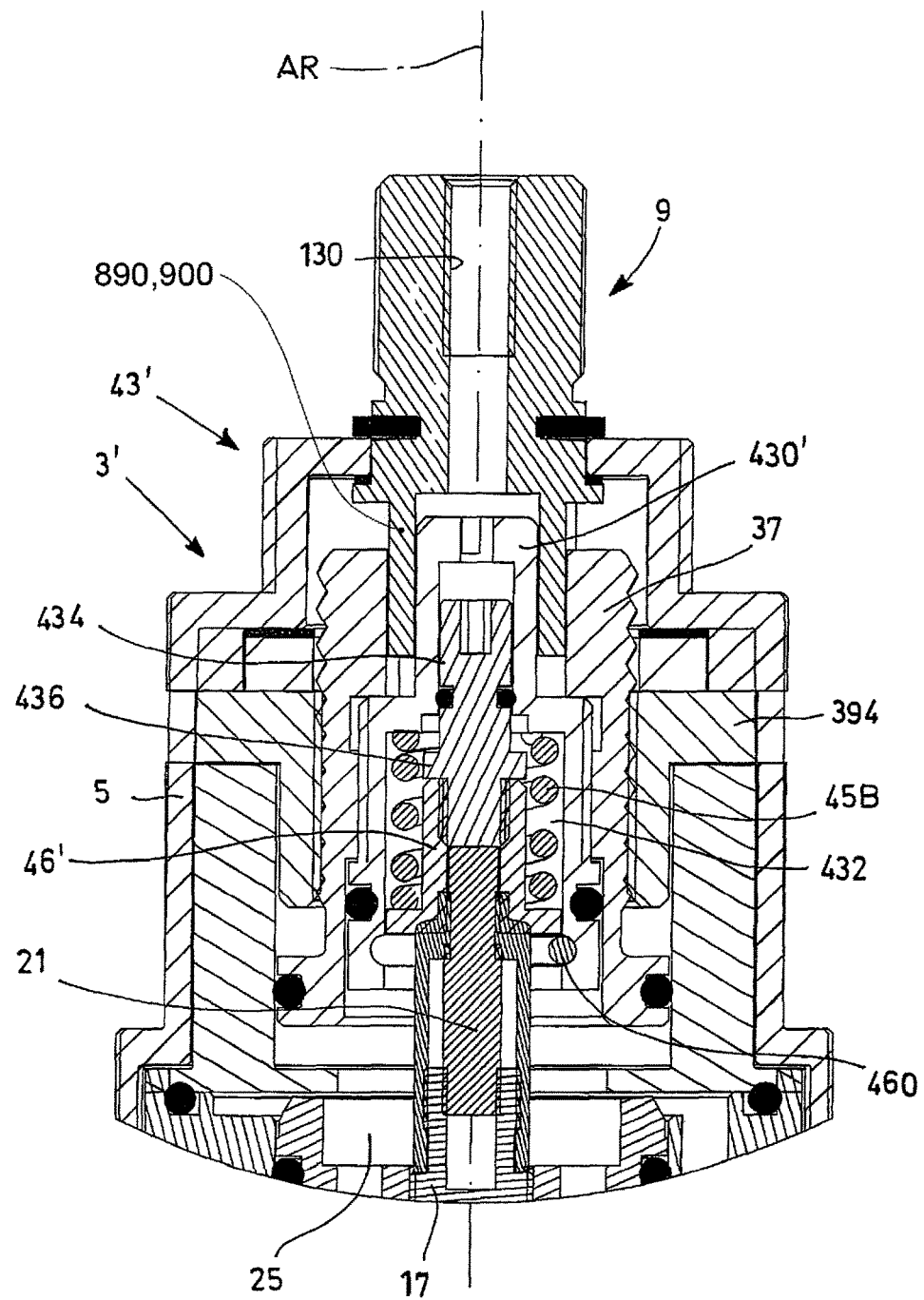
FIG. 6 shows a sectional view, according to section plane passing along the axis AR, of a thermostatic mixing valve assembly according to a particular embodiment of the invention.

For a fast and effective execution of anti-Legionella sterilisation cycles, a valve assembly according to the invention can advantageously be provided with the calibration system shown in FIG. 6, comprising:

a calibration head 430' arranged to move axially with respect to the rest of the valve assembly 3 when rotated on itself, for example, because rotating on itself and around the axis AR, the head 430' is screwed in the adjustment shaft 37 or is unscrewed from it; for this purpose, on the upper end of the head 430' is formed a seat for engagement with a suitable tool such as a screwdriver or an Allen wrench;

a support interface 46' to which is removably fixed an abutment spacer 434 arranged to rest against the thermostatic element assembly 15.

The support interface 46' can have a substantially tubular shape and be equipped, for example at a first end, with a flange against which rests the spring 45B, in which the interface 46' is inserted. At the opposite end, the spring 45B rests against an internal shoulder of the calibration head 430'.

The abutment spacer 434 can have the form of a pin threaded at one end, and at the other end of which is formed a seat suitable to be engaged with an Allen wrench or screwdriver, for example a Phillips or flat blade screwdriver. The threaded end of the abutment spacer 434 is screwed in the other end of the support interface 46', opposite to that against which rests the spring 45B and, in the so called abutment position, rests against the end of the stem 21 of the thermostatic element assembly. On the sides of the spacer 434 is advantageously formed a flange 436, or other shoulder, which rests against one end of the support interface 46'.

According to a possible embodiment, the manual control member 9 is removably associated, to the adjustment shaft 37 according to a prismatic coupling along said predetermined adjustment direction AR, said prismatic coupling allowing the connection between the manual control member 9 and the adjustment shaft 37 along the predetermined adjustment direction AR and, in the connection configuration, making integral in rotation the manual control member 9 and the adjustment shaft 37.

For example, said prismatic coupling is obtained by means of a coupling portion 890, such as for example said square or prismatic head 900, of the manual control member 9 and a corresponding counter-shaped hollow 476, such as for example the seat 376, of the adjustment shaft 37.

For example, said counter-shaped hollow 476 in turn houses the calibration head 430' so as to allow access from the outside and the relative movement, following the removal of the second knob 16 in order to have access to the manual control member 9. This greatly facilitates the calibration of the thermostatic cartridge by the installer following anti-Legionella heat treatment, making it possible to quickly recalibrate the valve.

Preferably, the spring 45B, the abutment spacer 434 and the support interface 46' are inserted in the calibration head 430'.

To calibrate the cartridge 3 in the factory, the calibration head 430' is rotated, for example with a screwdriver or Allen wrench inserted through the axial hole 130 formed in the head 13.

To perform anti-Legionella sterilisation after the cartridge 3 is installed in a water distribution system, one unscrews the abutment spacer 434 with a screwdriver or Allen wrench inserted through the axial hole 130 and through the other axial hole formed in the end of the head 430', until the spacer 434 is detached from the stem 21 so as to prevent the two returning in abutment even in the face of the maximum possible dilations of the bulb, thus making the spacer 434 pass from the abutment position to the disengaged position.

In the disengaged position the spring 45B continues to be pressed in opposite directions by the calibration head 430' and the support interface 46'; however, since the stem 21 cannot lean against the spacer 434, even if the thermostatic bulb 15 is dilated to the maximum, the shutter 19 is pushed fully upwards by the spring 45A, fully opening the hot water inlet 27 and fully closing that of the cold water 29. It is thus possible to run very hot water in the cartridge 3 to perform the anti-Legionella sterilisation without having to increase the calibration temperature of the thermostatic bulb. After the sterilisation cycle, always by means of a screwdriver, Allen wrench or other tool introduced through the hole 130 and into the hole that passes through the upper end of the calibration head 430', the spacer 434 is re-screwed in the upper end of the support interface 46', for example until it sends the flange 436 in abutment against the support interface 46': the stem 21 return in abutment against the spacer 434 allowing the thermostatic bulb 15 to return to normally adjusting the position of the shutter 19 according to its thermal expansion. The calibration system of FIG. 6 therefore allows a considerable saving of time as it avoids the need to recalibrate the temperature of each cartridge 3 of a system at the end of an anti-Legionella sterilisation cycle. The abutment constituted by the flange 436 allows quickly re-screwing the spacer 434 in the support interface 46' to exactly the same depth at which it was screwed before being removed, in the same position in which it was at the end of the previous calibration.

By convention, in Europe the taps and mixing valves of water distribution systems for home use are designed to receive the incoming hot water from a pipe coming from the left, and the cold water from a pipe coming from the right, with reference to the user's observation point. To ensure that by rotating the control member 9 starting from a condition of complete closure of the valve assembly, first only the cold water outlet is opening and only after an appreciable rota-tion, also the hot water outlet and the openings 110A,110B, 310A,310B are preferably not mirror shapes on the shutter 11 and on its seat 31.

Figure 8:
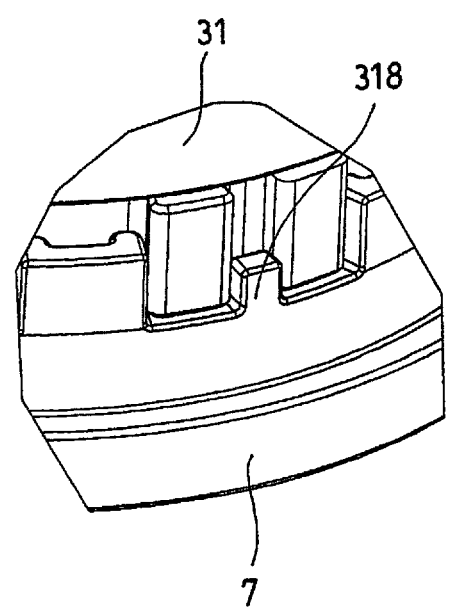
FIG. 8 shows a detail of the error-proof pin of the system of FIG. 7.

To avoid errors of assembly of the cartridge 3 in the factory, is possible td provide it with appropriate error-proof systems, for example:

by forming a seat in the bottom 7 arranged to receive the disc in the inlet shutter seat 31 only when the latter is in a first predetermined orientation; and/or by forming a suitable male/female coupling between the 33 and second inner tubular casing 35 so that the two may only mate when they have a first predetermined mutual orientation;

and these first predetermined orientations are such as to allow correct operating of the valve assembly 3 when the cold water reaches the assembly 3 through the first inlet mouth 29 and the hot water through the second inlet mouth 27 (FIGS. 7 and 8). For this purpose, the outer edge of the ceramic disc 31 may for example be provided with suitable projections 314A-314F and recesses 316A-316F arranged to mate with corresponding recesses and projections formed on the bottom 7 only if the disc 31 has a single predetermined orientation. Always to this end, the upper edge of the first tubular casing 33 can be provided with projections 330 arranged to mate with corresponding recesses 352 formed in the lower edge of the second tubular housing 35.

However, it may happen by mistake that the cold water pipe comes instead from the left and the hot water from the right.

To deal with similar problems, the bottom 7, preferably made of plastic, is preferably provided with one or more error-proof pins 318 arranged to be inserted in a corresponding recess 316A formed on the shutter seat 31 and at the same time arranged to be easily removed, for example by breaking them or cutting them with a cutter, and once this pin is removed, the seat of the bottom 7 is arranged to receive the ceramic disc 31 even in a second predetermined orientation that allows the valve assembly 3 to function properly even if supplied with a cold water pipe coming instead from the left and that of the hot water from the right.

Always to deal with the above-described problems, also on the first 33 or second tubular casing 35, there can be one or more error-proof pins 318' arranged to be inserted in corresponding recesses 316A' formed respectively on the second 35 or the first tubular casing 33; even the error-proof pins 318' are designed to be easily removed so that, after removing the first 33 and second tubular casing 35, they can be mutually engaged also in a second predetermined orientation that allows the valve assembly 3 to function properly even if supplied with a cold water pipe coming instead from the left and the that of the hot water coming from the right.

The second predetermined orientation of the disc 31 and the first 33 or the second tubular casing 35 can correspond for example to the first predetermined orientation+180°.

To lend itself to being easily broken or snapped off, each error-proof pin 318 can have one or more of the following characteristics, in correspondence with the area of fixing to the rest of the bottom 7 or the rest of the first 33 or second tubular casing 35:

a cross-section less than or equal to 6 square millimeters, and more preferably four square millimeters;

a maximum thickness less than or equal to 3 mm, and more preferably to 2 mm;

a thinned line that serves as a breaking guide;

a ratio between the maximum height and the maximum wall width or thickness equal to or greater than 1 and preferably equal to or greater than 1.5.

Clearly, in other embodiments not shown, the error-proof pin 318 can be realised on the ceramic disc 31, and the corresponding female seat 316A on the bottom 7. Furthermore, based on the specific mechanical construction, the assembly of the disc 31 or the tubular casings 33,35 in the second predetermined orientation, for example rotated 180°, may also require the assembly of the second ceramic disc 11 in a second predetermined orientation, for example also rotated by 180° with respect to the normal assembly in the factory.

In an embodiment not shown, the projections 314A-314F and the recesses 316A-316F formed on the ceramic disc 31 are symmetrical with respect to an ideal plane, and preferably only one, passing through the longitudinal axis AR of the cartridge 3, and the corresponding recesses or projections present in the seat formed in the bottom 7 for the disc 31 are equally symmetrical with respect to this plane; the error-proof pins 318 pins are absent. In this way the disc 31 can be inserted in the seat of the bottom 7 only in two angular positions staggered by 180° from each other. If by mistake the cold water pipe comes from the left and the that of the hot water from the right, the installer can easily disassemble the cartridge 3, rotate the disc 31 180° and reassembly the cartridge.

Similarly, in another embodiment not shown, the projections or recesses 330 formed on the first tubular casing 33 and arranged to mate with corresponding recesses or projections 352 formed on the second tubular casing 35 are symmetrical with respect to an ideal plane, and preferably to just one, passing through the longitudinal axis AR of the cartridge 3.

Figure 9:
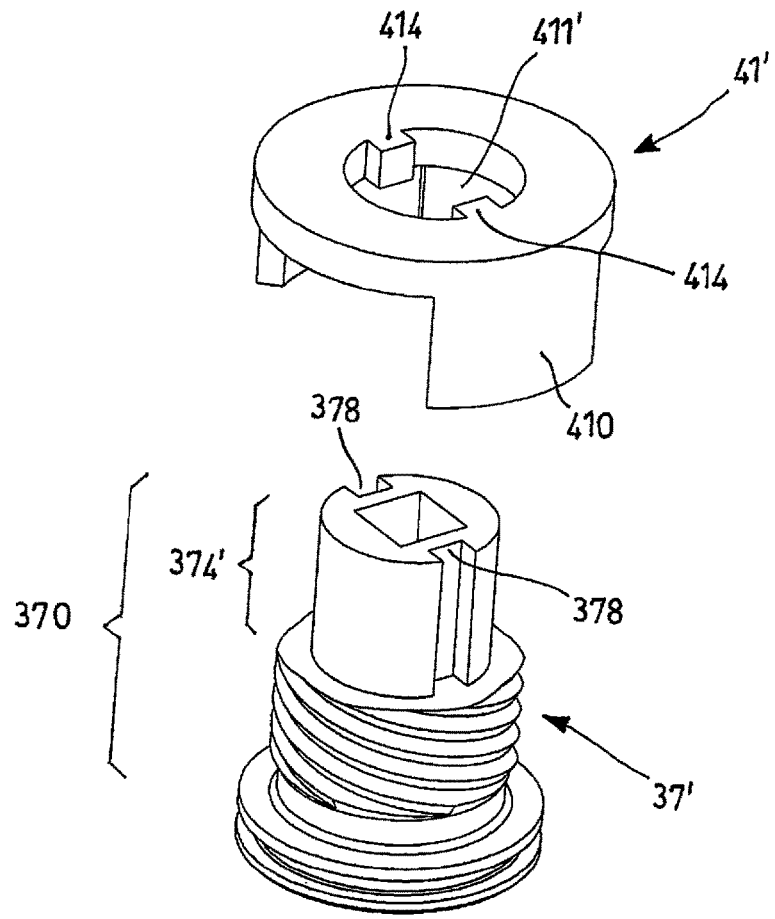
FIG. 9 shows an exploded perspective view of the adjustment shaft and drive element of a valve assembly according to a third particular embodiment of the invention.

FIG. 9 relates to a mixing valve assembly according to a third embodiment of the invention, in which the adjustment shaft 37, instead of radial projections, is provided with radial recesses 378 that engage with corresponding radial projections 414 formed on the driver element 41', preferably on the edges of the central opening 411'. In the embodiment of FIG. 9 each radial recess 378 forms a groove extending in the axial direction AR. On the adjustment shaft 37', there can be present one or more radial recesses 378. In this case, as in other embodiments not shown, the threaded portion 370 does not extend on the second portion 374' on which extend the radial recesses 378.

The embodiment examples previously described are susceptible of various modifications and variations without departing from the scope of this invention. A mixing valve assembly and tap according to the invention can be used not only in systems for dispensing hot sanitary water—or more generally a fluid—but also in systems for distributing water in kitchens, offices, hospitals or other working environments or industrial plants. The axial movements of the nut screw 39 can be locked not only by the grooved matrix 41 and/or the second inner tubular casing 35, but also by other axial locking elements. The threaded portion 370 of the adjustment shaft 37 can be replaced by a more generic conversion portion arranged to convert the rotations of the rotary head 13 into axial translations or rototranslations of the adjustment shaft 37. For example the threaded portion 370 can be replaced by a cam profile or by an driven element of a cam mechanism; in these last two cases, the driven element or the cam profile can be formed on a more generic female element that replaces the nut screw 39 and in which is inserted—or, in any case, with which it engages—a conversion portion of the shaft 37. The radial projections 372 may be not only the knurling of a splined shaft, but also for example the sides of a prismatic shaft of a prismatic coupling. The discs or plates of the shutter 11 and of the shutter seat 31 can be realised not only from ceramic material but also from different materials, such as for example stainless steels or other metallic or polymeric materials, possibly loaded with ceramics or other materials particularly resistant to wear. The discs or plates of the shutter 11 and of the shutter seat 31 may an overall shape not only flat, but also concave or convex. The spiral springs 45A,45B can be replaced by other types of springs or, more generally, by suitable elastic elements. The abutment spacer 434 can be fixed to the support interface 46' not only by means of a threaded connection, but also by means of different connections such as for example a bayonet connection. The second spring 45B can also be absent; in this case the abutment spacer 434 can be screwed directly or, more generally, fixed directly to the calibration head 430' instead of by means of the spring 45B and the support interface 46'.

The various components of the cartridge 3 can be made of metal or suitable plastic materials, except for several gasket seals that it is appropriate to make from elastomers or soft plastics. Moreover, all the details can be replaced by technically equivalent elements. For example, the materials used, as well as the dimensions, may be any according to the technical requirements. It should be understood that an expression of the type "A includes B, C, D" or "A is formed from B, C, D" also comprises and describes the particular case in which "A is constituted by B, C, D". The examples and lists of possible variations of this application are to be understood as non-exhaustive lists.

The invention claimed is:

1. Thermostatic mixing valve assembly, comprising:
a first and a second inlet mouth for the introduction of liquids at different temperatures;
a mixing assembly arranged to mix and homogenise said liquids at different temperatures;
an inlet shutter arranged to prevent or allow the inflow of said liquids at different temperatures towards the mixing assembly;
wherein the mixing assembly comprises a thermostatic adjustment system having a mixing chamber arranged to accommodate and mix the liquids at different temperatures and obtain a mixed liquid at a predetermined reference temperature, a thermostatic shutter arranged to adjust the inflows of said liquids into the mixing chamber, and a thermostatic element assembly arranged to actuate the thermostatic shutter by expanding or contracting based on a predetermined adjustment direction based on the temperature of the liquid that laps a thermostatic bulb in the mixing chamber;
a manual control member arranged to perform a control stroke with a single degree of freedom, controlling the inlet shutter and the thermostatic adjusting system to vary the flow rate and the reference temperature of the mixed liquid dispensed by the by mixing valve assembly;
wherein
the inlet shutter comprises a first plate of ceramic or other material,
the valve assembly comprises an adjustment shaft actuated by the manual control member and arranged to:
rotate the inlet shutter around a rotation axis parallel to said predetermined adjustment direction, so as to open the first and the second inlet mouth, wherein the inlet shutter is fixed axially with respect to the predetermined adjustment direction, and to move axially the thermostatic element assembly according to the predetermined adjustment direction (AR so as to adjust the predetermined reference temperature.

2. Valve assembly according to claim 1, wherein the mixing assembly is provided with an outlet mouth of the mixed liquid, and wherein said outlet mouth is arranged on the same side of the inlet mouths, axially opposite, to the manual control member with respect to the predetermined adjustment direction.

3. Valve assembly according to claim 1, wherein the adjustment shaft is arranged so that the thermostatic element assembly is exclusively provided with an axial movement along the predetermined adjustment direction, and the inlet shutter is exclusively provided with a rotary movement around a rotation axis parallel to the predetermined adjustment direction.

4. Valve assembly according to claim 1, wherein the manual control member comprises a rotary head and the adjustment shaft is provided with:
  a conversion portion arranged to convert the rotations of the rotary head into axial translations or rototranslations of the adjustment shaft; and
  one or more radial projections or radial recesses through which the rotary head, by rotating, makes in turn the inlet shutter rotate.

5. Valve assembly according to claim 4, wherein the conversion portion forms a thread or a profile or a driven element of a cam mechanism.

6. Assembly according to claim 4, wherein a plurality of radial projections or radial recesses forms a plurality of grooves that are longitudinal to the axis of the adjustment shaft and that extend along a portion of said adjustment shaft.

7. Assembly according to claim 6, wherein the conversion portion forms a thread that extends at least on a part and, preferably, on the entire portion of the adjustment shaft on which the plurality of longitudinal grooves extends.

8. Assembly according to claim 4, wherein the one or more radial projections or radial recesses extend on at least part of the conversion portion.

9. Assembly according to claim 1, comprising:
  a first elastic element;
  a calibration system arranged to adjust the position of equilibrium of the thermostatic element assembly according to the predetermined adjustment direction and in turn comprising:
  a calibration head arranged to move axially with respect to the rest of the valve assembly when it is rotated on itself;
  an abutment spacer fixed to the calibration head and arranged to switch reversibly from a first abutment position, in which it rests against the thermostatic element assembly, to a second disengagement position, in which it does not rest against the thermostatic element assembly thus leaving it free to expand axially;
  and wherein, in the first abutment position, the first elastic element pushes the thermostatic element assembly against the abutment spacer.

10. Assembly according to claim 9, comprising a second elastic element, and wherein:
  the calibration system comprises
  a support interface to which is fixed the abutment spacer;
  in the first abutment position the first and the second elastic elements push the thermostatic element assembly in two opposite directions according to the predetermined adjustment direction.

11. Assembly according claim 9, wherein the manual control member is removably associated to the adjustment shaft according to a prismatic coupling along said predetermined adjustment direction, said prismatic coupling allowing the connection between the manual control member and the adjustment shaft along the predetermined adjustment direction and, in the connection configuration, making integral in rotation the manual control member and the adjustment shaft.

12. Assembly according to claim 11, wherein said prismatic coupling is obtained by means of a coupling portion of the manual control member and a corresponding counter-shaped hollow of the adjustment shaft.

13. Assembly according to claim 12, wherein said counter-shaped hollow in turn houses the calibration head so as to allow access from the outside and the relative movement, following the removal of a knob in order to have access to the manual control member.

14. Assembly according to claim 1, comprising:
  a shutter seat comprising a second disc possibly of ceramic and wherein the inflows of cold and hot liquids towards the mixing assembly are allowed or prevented according to how the disc of the inlet shutter is rotated with respect to the disc of the shutter seat;
  a bottom in which a seat is obtained, which is arranged to accommodate the disc of the inlet shutter seat only when the latter is in a first predetermined orientation, allowing the correct operation of the valve assembly when the cold liquid reaches the assembly through the first inlet mouth and the hot liquid through the second inlet mouth;
and wherein:
  a portion of the bottom forms with the disc of the inlet shutter seat a male-female coupling comprising a pin or other error-proof projection;
  by removing the pin or other error-proof projection, the disc of the inlet shutter seat can be inserted into the seat of the bottom in a second predetermined orientation allowing the correct operation of the valve assembly when the cold liquid reaches the assembly through the second inlet mouth and the hot liquid through the first inlet mouth.

15. Valve assembly according to claim 14, comprising a first casing and a second inner tubular casing, each of which having both ends opened and prepared to be axially coupled to one another so as not to be able to rotate with respect to one another,
  wherein a suitable male/female coupling is formed between the first casing and second inner tubular casing so that the two may only mate when they have a first predetermined mutual orientation;
  and these first predetermined orientations are such as to allow correct operating of the valve assembly when the cold water reaches the assembly through the first inlet mouth and the hot water through the second inlet mouth.

16. Valve assembly according to claim 1, comprising a first inlet mouth arranged to be supplied from a hot liquid source and a second inlet mouth arranged to be supplied from a cold liquid source, and wherein:
  the first inlet mouth and the second inlet mouth are arranged to supply the mixing chamber;
  the manual control member, following its control stroke moving away from the condition in which both the first and the second inlet mouths are closed, at least on part of the control stroke, acts on the thermostatic adjusting system so as to increase the predetermined reference temperature.

17. Valve assembly according to claim 1, configured in such a way that when the manual control member starts its control stroke starting from a condition in which the inlet shutter prevents the inflow of both the cold and hot liquids towards the mixing assembly, for a predetermined initial section of the control stroke, the valve assembly ensures that the inlet shutter and/or the thermostatic shutter allow the inflow of only the cold liquid towards the mixing assembly.

18. Water dispensing tap, comprising a mixing valve assembly having the features according to one claim 1.

19. Water distribution system for civil use, comprising a cold water source, a hot water source, a tap having the features according to claim 18, and wherein the cold water source and the hot water source are fluidically connected to the thermostatic valve assembly so as to supply the mixing chamber.

\* \* \* \* \*